INVENTOR
HOMER C. DODD
BY
ATTORNEY

Feb. 13, 1973     H. C. DODD     3,716,151
POWER DRIVEN LIFTING AND POSITIONING DEVICE
Filed Jan. 29, 1971     2 Sheets-Sheet 2

INVENTOR
HOMER C. DODD
BY Patrick O. Henry
ATTORNEY

United States Patent Office 3,716,151
Patented Feb. 13, 1973

3,716,151
POWER DRIVEN LIFTING AND POSITIONING DEVICE
Homer C. Dodd, Atlanta, Ga.
(Box 1099-F, Rte. 6, Brooksville, Fla. 33512)
Filed Jan. 29, 1971, Ser. No. 111,038
Int. Cl. B60p 1/48
U.S. Cl. 214—77 R                    1 Claim

ABSTRACT OF THE DISCLOSURE

Especially suited for lifting vehicles such as automobiles and small trucks to load same on the back of another, larger vehicle such as a tractor trailer truck, a box-like lifting frame comprising a vertical, steel channel post at each of the four corners is structurally rigid by means of transverse steel rod members and a pair of longitudinal frame members across the tops of respective pairs of corner posts. Lifting supports across the bottom of the frame are constructed from metal tread plate attached by steel rods. The bottom of the box-like frame is of a size to correspond with and fit into the bed of a transport truck. Large, long lifting levers made from steel channel have one end pivotally attached to the sides of the truck bed on each of the two sides and the other end is attached substantially medially by a pivot pin to the top channels. A hydraulic cylinder on each side of the truck bed has one end pivotally attached to the truck bed and the end of the extensive cylinder rod therein pivotally attached at a point less than half the distance of the long lever. Suitable hydraulic control means is provided to be operated from a hydraulic pump controlled from the transport truck. Operation of the hydraulic cylinder in one direction causes the piston rod to extend thereby pivoting the long levers about the truck bed pivot point to place the large box frame on the ground or beneath a vehicle after which actuation of the hydraulic cylinders to return the piston rod lifts the entire frame with the vehicle thereon and places it on the bed of the truck.

BACKGROUND OF THE INVENTION (1) Field of the invention

Vehicle lifting devices especially those mounted on other vehicles in the general category sometimes called wreckers. Lifting devices with pivoted frames movable from the ground to an elevated position and vice versa.

(2) Description of the prior art

The prior art includes the conventional automobile wrecker which usually employs a crane with a cable and hook arrangement for lifting one end of the automobile. Such arrangements are not suitable for lifting the entire vehicle from the ground and transferring it linearly for placement on a transport truck. Forklift trucks are not suitable for lifting uncrated vehicles and furthermore such trucks are rather expensive and not always available for this particular use. Sometimes automobiles and small trucks must be transported a distance—possibly even from one state to a remote state—and for various reasons the automobile or truck may not be operative or towing may be prohibited for some reason. There is a demand for an inexpensive lifting and positioning arrangement which can be attached to the back of a flatbed truck or a tractor trailer arrangement.

SUMMARY OF THE INVENTION

By providing a movable frame attached to the sides of a flatbed truck or trailer and power driving same selectively by means of a hydraulic cylinder, it is possible to position lifting supports on the bottom of the frame beneath a vehicle on the ground and then lift that vehicle and place it on the back of the truck or trailer thereby eliminating auxiliary equipment such as cranes, hoists or elevated tread arrangements. Upon arrival at its destination the automobile or truck is easily lifted and placed on the ground for use at any place without the use of any auxiliary equipment since the entire lifting mechanism needed is mounted directly on the truck or trailer. With this arrangement it is possible to pick up an automobile or small truck and the like at any location, whether a service station, new car dealer or any other place, and then transport same directly to the destination, which could even be the home of the recipient, without any special auxiliary lifting equipment or the like being on hand either at the origin or destination. The arrangement is simple and inexpensive and can be removed from and installed on any truck or trailer.

DESCRIPTION OF THE PREFERRED EMBODIMENT

Figure 1:
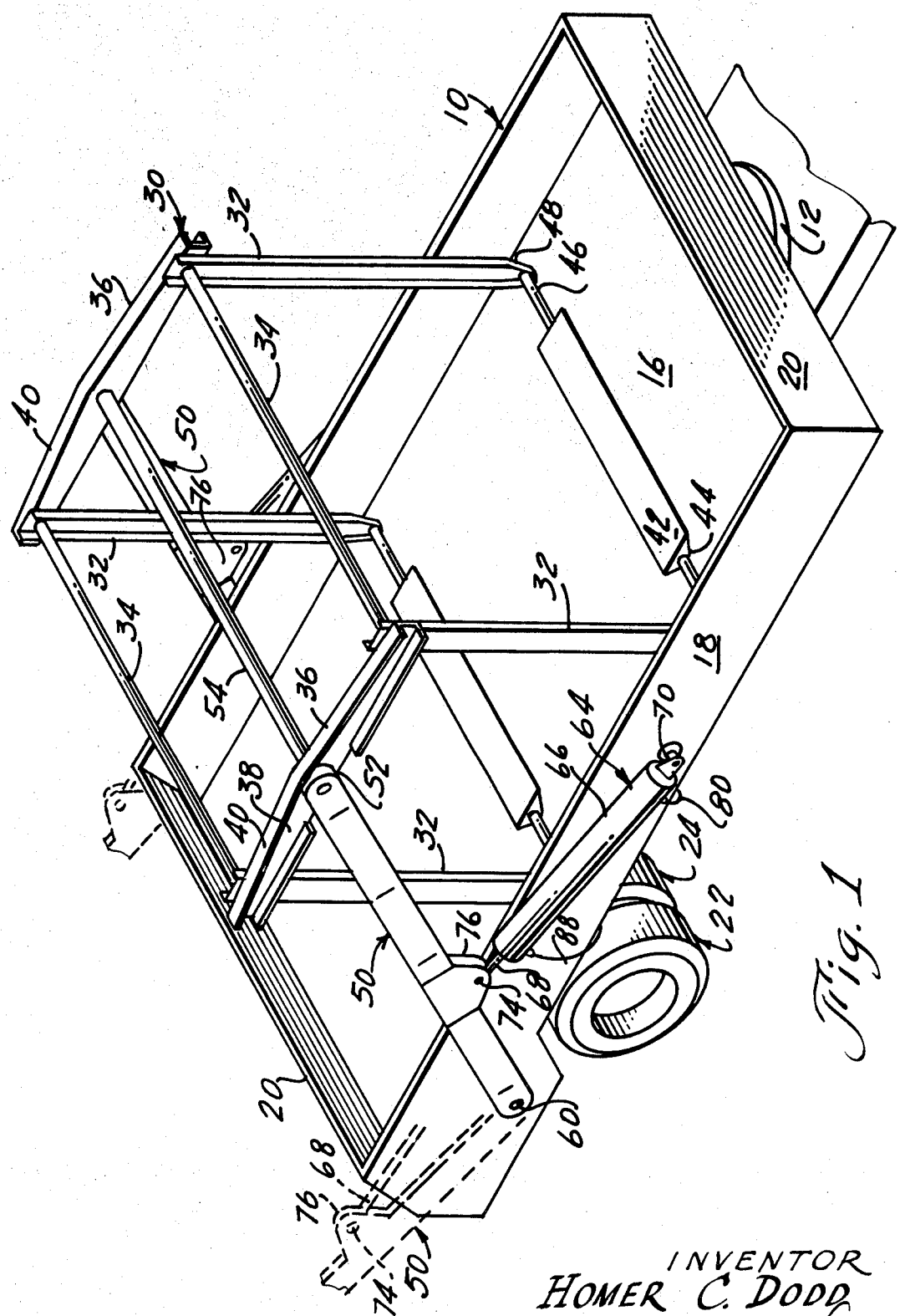
FIG. 1 is a perspective view of a typical over the highway trailer with the present lifting apparatus mounted thereon.
Figure 3:
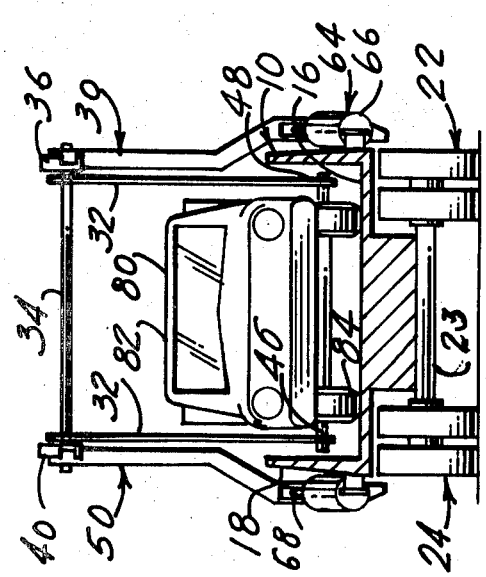
FIG. 3 is a rear cross-section view along lines 3—3 of the trailer, pickup-truck and lifting apparatus shown in FIG. 2 but with the pickup truck in final position on the trailer illustrating stationary transport arrangement.

A typical over-the-highway trailer designated generally by reference numeral 10 is attached by the usual fifth wheel arrangement 12 to the rear of a tractor 14 (not shown). Trailer 10 has a large flat bed 16 with steel channel or plate sides 18 on each of the opposite sides and front and rear 20. The bed 16 may be constructed from elongated frame members covered by steel plate or heavy board or the like. According to conventional construction there is a rear wheel assembly 22 which includes an axle 23 and a pair of dual wheels 24 on each side.

The present lifting apparatus and device is designated generally by reference numeral 30 and comprises a vehicle support and lifting means constructed in a box-like arrangement comprising elongated steel channels 32 at each of four corners connected transversely corresponding to the transverse direction of the bed 16 by means of steel rod members 34 welded, screwed or otherwise attached in place.

The upper ends of each of a pair of the members 32 on each side are connected by a frame support member 36 constructed in the form of a steel truss made for elongated steel plate 38 and projecting flanges 40 and the ends of the member 36 are welded in place to the ends of the tops of the members 32. The bottoms of each of the ends of respective members 32 across the front and the back are connected by the vehicle support and lifting means comprising lift plate assemblies designated generally by reference numeral 41 which are constructed from steel tread plate 42 having additional support plate 44 welded thereto and each assembly 41 has an elongated steel rod 46 passing thereto and welded in place to the assemblies 41 and to the respective lower ends 48 of each of the members 32.

A lifting arm or lever 50 on each side of the bed 16 is constructed from steel box channel and has one end 52 pivotally attached to a transverse pivot rod member 54 extending approximately midway between each of the members 36. The lower end of the lever or arm 50 on each side is attached by a pivot pin 60 to each side of the metal plate on the upstanding sides 18.

A hydraulic cylinder arrangement designated generally by reference numeral 64 comprises a double-acting cylinder 66 and a double-acting rod 68, meaning that the rod 68 is power driven from cylinder 66 both outwardly and inwardly. Cylinder 66 is pivotally attached at one end 70 to the metal plate on the side 18 of the truck bed 16 and the end of rod 68 is pivotally attached by pivot pin 74 to spaced plates 76 located intermediate the pivot pin 60 and the approximate middle of the arm or lever 50.

Figure 2:
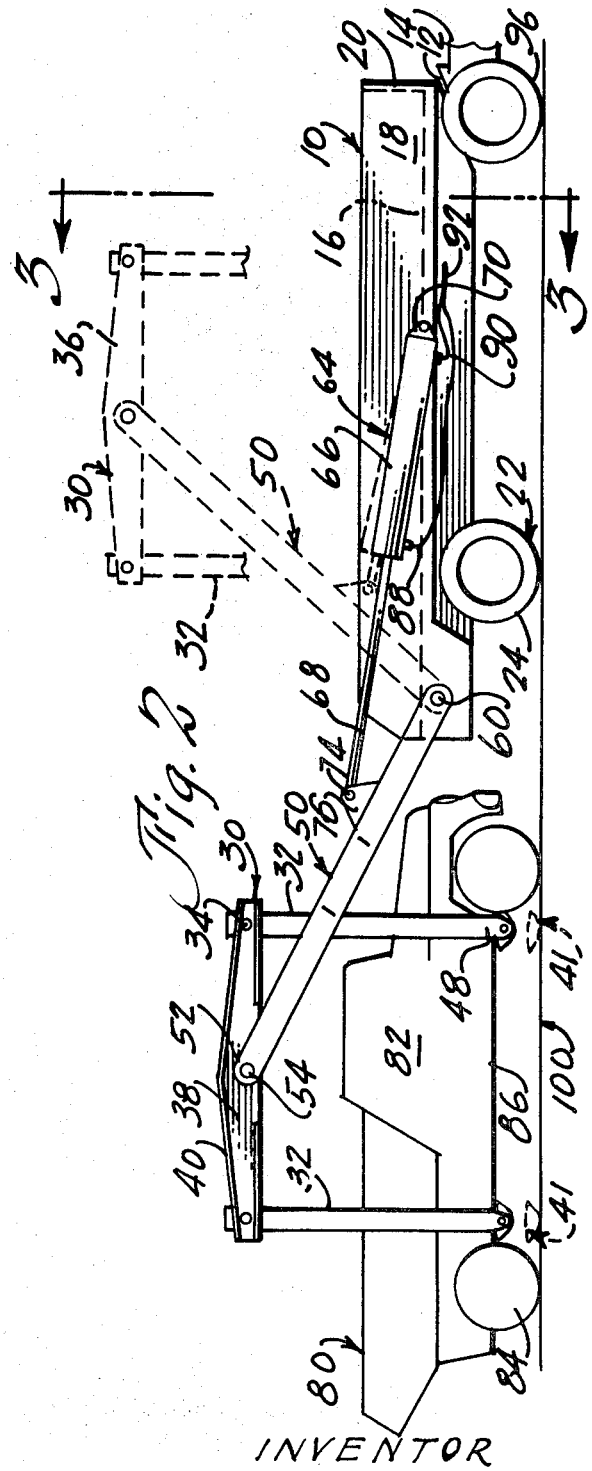
FIG. 2 is a side elevation view of the trailer in FIG. 1 in position with the lifting frame beneath a small pickup truck to be lifted with dotted lines illustrating the final positioning.

Referring to FIG. 2, a typical pickup truck designated generally by reference numeral 80 comprises a body 82, wheels 84 and an under carriage or frame chassis 86 of conventional construction. Hydraulic lines 88, 90 leading to the cylinder 64 receives hydraulic fluid pumped under pressure from a line 92 leading to suitable control means and a hydraulic power pump which may be driven by a conventional power take off from the drive shaft of the truck 14 which drives the wheels 96 thereof. From the position shown in the full lines of FIG. 1, operation of the hydraulic control causing fluid to flow under pressure through the line 90 will extend the piston rod 68 on each side of the flat truck bed 16 thereby causing the lever arms 50 on each side to lift the entire box-like frame 30 from the position shown in the dotted lines of FIG. 2 and the full lines of FIG. 1 to the position rearward of the end of the trailer 10 shown in the full line positions of FIG. 2 moved from the full position shown by the dotted lines of the tread members 40 in FIG. 2 where the tread members 40 are on the ground 100. In the lowermost position the truck 80 is drivable and may be driven across the tread members 42 to align the tread members inside the wheels 84 at which time the hydraulic cylinder 64 is actuated to pump fluid through line 88 to retract the rod 68 thereby lifting the entire box frame 30 with the vehicle 80 back to the position of the full lines in FIG. 1 and the dotted lines in FIG. 2. The controls for the hydraulic cylinder 64 may be actuated until the wheels 84 of the truck 80 rests on the flat bed 16 still with the frame 30 in place with the tread members 42 firmly engaging and beneath the chassis 86 of the truck 80 thereby holding the truck 80 firmly in place for transport although additional chain or other blocks and securing means may be added as a precaution.

Upon arrival at the destination, the hydraulic controls are operated to actuate the piston rod 68 thereby extending same to actuate the levers 50 about the pivot pin 60 to return the box-like frame 30 with the vehicle 80 to the ground position shown in FIG. 2 rearward of the trailer 10 whereupon when the vehicle 80 is self-supporting on its own tires on wheels 84 the frame 30 may be lowered to touch the ground so that the vehicle 80 may be either pushed, rolled or driven therefrom and the piston rod 68 actuated to retract and return the frame 30 back to the truck bed 16.

While I have shown and described a particular preferred embodiment of the present invention and a suggested mode of operation this is by way of illustration only since there are many alterations, changes, eliminations, deviations, substitutions, additions, combinings, and other departures which may be made in the preferred embodiments shown and described, and in the operation thereof, without departing from the scope of my invention as defined by a proper interpretation of the appended What is claimed:

1. In a vehicle lifting device mounted on a first, transport vehicle such as a truck or trailer for lifting and placing a second vehicle including an automobile thereon in a space at the rear of said first, transport vehicle by moving the second vehicle from the ground upwardly or vice versa from the space to the ground:

(a) a lifting frame movably attached to said first transport vehicle body by respective lifting arms pivotally connected to each of the opposite sides of said first, transport vehicle and outside the space at the rear thereof onto which said second vehicle is placed, (b) said lifting frame comprising a respective frame support member for each of said lifting arms and each respective lifting arm being pivotally connected to each respective frame support member intermediate the length thereof whereby said pivotally mounted frame support members may pivot on said pivots to remain substantially level when being moved with the second vehicle thereon, (c) vertical members having one end thereof connected adjacent a respective end of each of the ends of the respective frame support members, there being one such vertical member at each of the ends of the frame support members thereby defining a box-like, quadrilateral lifting frame, (d) a hydraulic cylinder assembly on each side of said first transport vehicle corresponding to the respective lifting arm thereon and each of said hydraulic cylinder assemblies having a piston rod operatively connected to a respective lifting arm to move same about the respective pivot to lower the lifting frame to the ground behind the rear of the first transport vehicle and vice versa when on the ground to return same to the space at the rear of said first, transport vehicle, (e) vehicle support and lifting members attached to each of the vertical members and extending inwardly therefrom in a direction across the lifting frame and transversely to the first, transport vehicle and the space thereon at the rear thereof onto which said second vehicle is placed, said vehicle support and lifting members engaging the underside of the second vehicle to be lifted and being positioned beneath said second vehicle to engage same when said hydraulic cylinder assembles are actuated by hydraulic power to lift said second vehicle, (f) said vehicle support and lifting members being tread members supported transversely across said lifting frame and connected to the respective vertical members, (g) the tread members each having a shaft on each end thereof connected to said respective vertical member each shaft being pivoted to the respective vertical member, and (h) each vertical member being connected by an upper side member thereacross.

References Cited
UNITED STATES PATENTS

| | | | |
|---|---|---|---|
| 2,567,178 | 9/1951 | Bird | 214—77 R |
| 3,448,874 | 6/1969 | Martinson | 214—77 R |
| 3,157,424 | 11/1964 | Hall | 294—67 D |
| 2,909,296 | 10/1959 | Keys | 214—77 R |
| 3,513,997 | 5/1970 | Heyer et al. | 214—77 R |
| 1,757,798 | 5/1930 | Grab | 214—392 |
| 2,512,333 | 6/1950 | Jaffa et al. | 214—392 |

ROBERT J. SPAR, Primary Examiner

U.S. Cl. X.R.
294—67 DC